United States Patent
Kerschbaum et al.

(10) Patent No.: US 8,060,758 B2
(45) Date of Patent: Nov. 15, 2011

(54) ITEM TRACING WITH SUPPLY CHAIN SECRECY USING RFID TAGS AND AN IDENTITY-BASED ENCRYPTION SCHEME

(75) Inventors: Florian Kerschbaum, Karlsruhe (DE); Leonardo Weiss Ferreira Chaves, Karlsruhe (DE)

(73) Assignee: SAP AG, Walldorf (DE)

( * ) Notice: Subject to any disclaimer, the term of this patent is extended or adjusted under 35 U.S.C. 154(b) by 731 days.

(21) Appl. No.: 12/164,589

(22) Filed: Jun. 30, 2008

(65) Prior Publication Data

US 2009/0323928 A1 Dec. 31, 2009

(51) Int. Cl.
G06F 11/30 (2006.01)
G06F 21/00 (2006.01)

(52) U.S. Cl. ........... 713/194; 726/35; 235/384; 235/385

(58) Field of Classification Search ............. 726/34, 726/35; 713/194; 380/202; 705/56–58; 235/375, 376, 383–385

See application file for complete search history.

(56) References Cited

U.S. PATENT DOCUMENTS

| | | | |
|---|---|---|---|
| 6,813,709 B1 * | 11/2004 | Benardeau | 713/172 |
| 2004/0200892 A1 | 10/2004 | Curkendall et al. | |
| 2007/0186105 A1 | 8/2007 | Bailey et al. | |
| 2007/0206786 A1 * | 9/2007 | Chakraborty | 380/30 |
| 2007/0279227 A1 | 12/2007 | Juels | |
| 2008/0001752 A1 | 1/2008 | Bruns et al. | |
| 2008/0065892 A1 | 3/2008 | Bailey et al. | |
| 2008/0170701 A1 * | 7/2008 | Matsuo et al. | 380/281 |
| 2009/0034716 A1 * | 2/2009 | Teranishi | 380/28 |

FOREIGN PATENT DOCUMENTS

WO 2007122425 A1 11/2007
WO 2007128966 A1 11/2007

OTHER PUBLICATIONS

Ateniese, Giuseppe et al., "Untraceable RFID Tags via Insubvertible Encryption", CCS'05, Nov. 7-11, 2005, Alexandria, Virginia, USA, (Nov. 7, 2005).
Extended European Search Report for EP Patent Application No. 09008546.5, mailed Oct. 7, 2009, 9 pages.
Liang, Y., et al "RFID System Security Using Identity-Based Cryptography", Ubiquitous Intelligence and Computing, LNCS vol. 5061 (Jun. 23, 2008), pp. 482-489.
Saito, J., et al "Enhancing Privacy of Universal Re-Encryption Scheme for RFID Tags", Embedded and Ubiquitous Computing, LNCS vol. 3207 (Jul. 30, 2004), pp. 879-890.
Response to Office Action for EP Application No. 09008546.5, filed Nov. 29, 2010, 20 pages.
Office Action for EP Application No. 09008546.5, mailed Jul. 19, 2010, 6 pages.
Response to Office Action for EP Application No. 09008546.5, filed Jan. 29, 2010, 18 pages.

* cited by examiner

*Primary Examiner* — Gilberto Barron, Jr.
*Assistant Examiner* — Malcolm Cribbs
(74) *Attorney, Agent, or Firm* — Brake Hughes Bellermann LLP

(57) ABSTRACT

A method for tracing an item may include encrypting item information using an identity-based encryption scheme with a batch number for an item as an encryption key and communicating the encrypted item information for storage on a radio frequency identification (RFID) tag for attachment to the item.

18 Claims, 8 Drawing Sheets

ITEM TRACING WITH SUPPLY CHAIN SECRECY USING RFID TAGS AND AN IDENTITY-BASED ENCRYPTION SCHEME

TECHNICAL FIELD

This description relates to item tracing with supply chain secrecy using radio frequency identification (RFID) tags and an identity-based encryption scheme.

BACKGROUND

Product tracing may allow the tracing of goods and/or parts across the partially or entirely reconstructed supply chain. Product tracing may allow the producer to recall certain batches in case of quality problems or defects that may jeopardize product reliability. Product tracing may be an expensive and difficult task, as supply chains may be long and involve several manufacturers/producers and several different materials. Furthermore, materials from different batches may contribute to a single batch of a finished product. Thus, when a recall is issued, many suppliers and many batches may be involved.

Product tracing may be used by different industries. For example, tracing may be used in food products and pharmaceuticals, to enable food product and pharmaceutical recalls if rotten ingredients contaminate certain food batches or pharmaceutical batches. Tracing may be used for quality assurance, for example, in the automotive, aerospace and other industries. Also, laws and regulations have been enacted regarding product traceability. For example, in Europe batch recalls are enforced through European Union (EU) regulation 178/02, and in the United States they are enforced by the Food and Drug Administration (FDA).

Current product tracing solutions may not enable the supply chain privacy desired by producers and manufacturers. The public availability of product tracing information may allow competitors or even collaborators to inspect a producer's supply chain and make an assessment of the producer's logistics or product capabilities, even without any recalls having been issued. Some product tracing solutions may slowly react to product recalls due to an enormous communications overhead. Consequently, producers may desire a solution that enables supply chain secrecy to protect supply chain logistics and product capabilities. Suppliers also may desire a solution that enables faster product recalls without an enormous communications overhead.

SUMMARY

According to one general aspect, a method for tracing an item may include encrypting item information using an identity-based encryption scheme with a batch number for an item as an encryption key and communicating the encrypted item information for storage on a radio frequency identification (RFID) tag for attachment to the item.

Implementations may include one or more of the following features. For example, the method may further include re-encrypting the encrypted item information using the identity-based encryption scheme to re-randomize the encrypted item information. The encrypted item information may include item recall information. In one exemplary implementation, the identity-based encryption scheme may include a Boneh-Franklin encryption scheme. In another exemplary implementation, the identity-based encryption scheme may include a Boneh-Boyen-Goh encryption scheme.

The RFID tag may include multiple different pieces of encrypted item information and each of the multiple different pieces of encrypted item information may be independently accessible and decryptable. The method may further include communicating the batch number to a trusted third party. The method also may include generating a decryption key using the batch number. The method also may include issuing a recall of the item by generating a decryption key using the batch number and making the decryption key available to users of the item.

In another general aspect, a method for re-encrypting item information may include receiving encrypted item information, re-encrypting the encrypted item information using an identity-based encryption scheme to re-randomize the encrypted item information, and communicating the re-encrypted item information for storage on a radio frequency identification (RFID) tag.

Implementations may include one or more of the following features. For example, the identity-based encryption scheme may include a Boneh-Franklin encryption scheme. In another exemplary implementation, the identity-based encryption scheme may include a Boneh-Boyen-Goh encryption scheme.

The method also may include encrypting new item information using the identity-based encryption scheme with a batch number for a new item as an encryption key and communicating the encrypted new item information to the RFID tag. The RFID tag may include multiple different pieces of encrypted item information and each of the multiple different pieces of encrypted item information may be independently accessible and decryptable.

In another general aspect, a radio frequency identification (RFID) tag may include a receiver module that is arranged and configured to receive multiple different pieces of encrypted item information and a storage module that is arranged and configured to receive multiple different pieces of encrypted item information and a storage module that is arranged and configured to store the multiple different pieces of encrypted item information, where each of the multiple different pieces of encrypted item information is independently accessible and decryptable.

Implementations may include one or more of the following features. For example, each of the multiple different pieces of encrypted item information may be re-encrypted using an identity-based encryption scheme to re-randomize the pieces of encrypted item information. In one exemplary implementation, the RFID tag may be a passive RFID tag. In another exemplary implementation, the RFID tag may be an active RFID tag.

In another general aspect, a computer program product for encrypting item information may be tangibly embodied on a computer-readable medium and include executable code that, when executed, may be configured to cause at least one data processing apparatus to execute an encryption module. The encryption module may be configured to encrypt item information using an identity-based encryption scheme with a batch number as an item for an encryption key and communicate the encrypted item information for storage on a radio frequency identification (RFID) tag for attachment to the item.

Implementations may include one or more of the following features. For example, the computer program product may further include executable code that, when executed, may be configured to cause the at least one data apparatus to execute a re-encryption module. The re-encryption module may be configured to re-encrypt the encrypted item information using the identity-based encryption scheme to re-randomize the encrypted item information.

The details of one or more implementations are set forth in the accompanying drawings and the description below. Other features will be apparent from the description and drawings, and from the claims.

DETAILED DESCRIPTION

Figure 1:
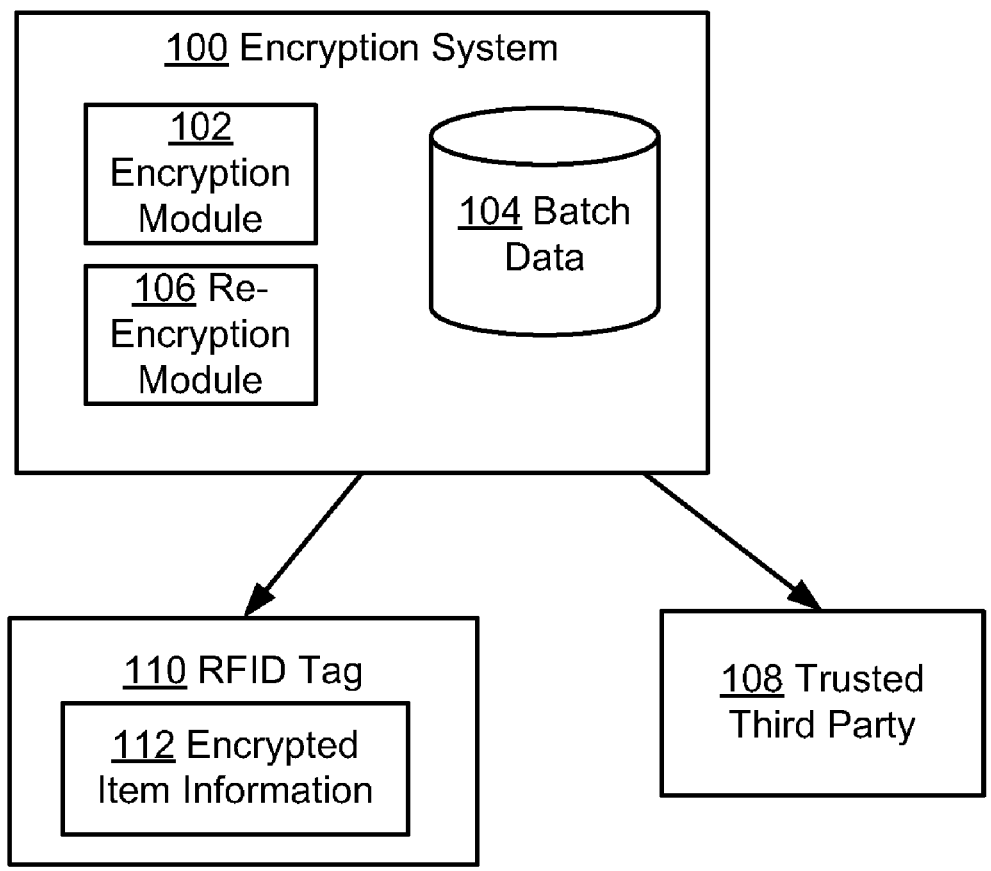
FIG. 1 is an exemplary block diagram of an encryption system.

In one exemplary implementation, product tracing may be enabled by using radio frequency identification (RFID) tags that contain encrypted item information. The encrypted item information may include product tracing information, item recall information or any other type of information that the producer, distributor or manufacturer would desire to make public, for example, in the event of a product recall.

In one exemplary implementation, the item information may be encrypted using an identity-based encryption scheme. Each producer may use their own unique batch number as an encryption key to encrypt the item information using the identity-based encryption scheme. In each part of the supply chain, each producer would include the encrypted item information about the batch produced and about the products and batches used in the products. Each producer would communicate the encrypted item information to an RFID tag and attach the RFID tag to their item.

The identity-based encryption scheme may include both a private encrypted key (e.g., the batch number) and public cryptographic information, which may be known to participants of the supply chain. However, the encrypted item information may not be revealed with just the public cryptographic information. Both components are needed in order to generate a decryption key to reveal the encrypted item information. In this manner, each producer needs only to maintain a database of their own batch number in order to decrypt the encrypted item information. Each producer may maintain the batch number information themselves or may share it with a trusted third party.

As an item proceeds along the supply chain, each producer in the supply chain may re-encrypt the encrypted item information from previous producers using the identity-based encryption scheme to re-randomize the encrypted item information. In addition, each producer may add their own encrypted item information and store both the encrypted item information and the re-encrypted item information on an RFID tag that is attached to the item. In one exemplary implementation, each producer may use their own unique batch number as the private encryption key. In this manner, the encryption scheme enables a simple key management since each producer needs only to maintain their batch number or entrust the batch number to the trusted third party.

Encrypting the item information using an identity-based encryption scheme also enables industrial privacy because as an item proceeds along the supply chain the encrypted information contained on the RFID tag is re-encrypted using the identity-based encryption scheme, which re-randomizes the encrypted item information.

Encrypting the item information using an identity-based encryption scheme also enables any producer along the supply chain to recall one of its items without the assistance of a downstream producer or distributor in the supply chain. In order for a particular item to be recalled, the producer need only to make public a decryption key using their own batch number. In one implementation, the producer issuing the recall may provide the batch number to be recalled to the trusted third party, who then would generate the decryption key using the batch number and the public cryptographic information. The decryption key would then be made available to all users such that an RFID reader would be able to scan products in the supply chain and would reveal the encrypted recall information if one of those products was decoded using the decryption key. Only products matching the decryption key would reveal their encrypted item information. Thus, secrecy of item information in the supply chain would be maintained. Without a product recall, no information about the supply chain is available to the reseller or any intermediary production facility.

The use of RFID tags may further ease recalls, as checks can be done almost anywhere. Checks of products for recalls may be performed by producers along the supply chain as well as end retailers such as a store or an end user even at home using a smart refrigerator (e.g., a refrigerator equipped with an RFID reader).

Referring to FIG. 1, an encryption system 100 is illustrated. The encryption system 100 may include an encryption module 102, a batch data 104, and a re-encryption module 106. The encryption system 100 may be used to encrypt item information regarding a particular batch or ingredient of a product.

The encryption module 102 may be configured to encrypt item information using an identity-based encryption scheme with a batch number for an item as an encryption key. In identity-based encryption any string may be used as a key to encrypt. In one exemplary implementation, the batch number is used as the string by a producer to encrypt the item information. In this manner, the encryption system 100 enables a simple key management because the only information that needs to be maintained by a producer is the batch number information, which the producer is likely to maintain in order to track batches. In the identity-based encryption scheme, a trusted third party 108 may be used to set up some basic (public) parameters. Then, the key may be any string, for example, a batch number. To obtain the decryption key, a producer presents the key to the trusted third party and proves that he has the right to obtain the decryption key. Then, the trusted third party issues the decryption key. The encryption is randomized, such that a cipher text does not reveal any information.

In one exemplary implementation, the identity-based encryption scheme may include a Boneh-Franklin encryption scheme. The Boneh-Franklin encryption scheme is based on pairings and elliptic curves. The schemes denote points on an elliptic curve with uppercase letters: P, Q . . . and numbers in $Z_P$ with lowercase letters; r, s . . . . A pairing such as the Weil pairing, may include special properties. The following equation denotes the cryptographic pairing used in the Boneh- Franklin identity-based encryption scheme with e(P, Q) denoting the cryptographic pairing.

$$e(rP,Q)=e(P,rQ)=e(P,Q)^r$$

$$e(P,Q) \neq 1 (w.h.p.)$$

P and T=tP are the public parameters of the Boneh-Franklin encryption scheme, with t being the private information of the trusted third party 108. For encryption with the identity ID, one chooses a random number r. Let $H_I$ be a cryptographic hash function that maps identities to points on the elliptic curve. Then, one computes $e(H_I(ID), T)^r$. Let $H_C$ be a cryptographic hash function that maps pairs to bit strings of a fixed length. Cipher text or message m is then:

$$rP, H_C(e(H_I(ID),T)^r) \oplus m$$

For the decryption key, one obtains $tH_I(ID)$ from the trusted third party 108 and computes:

$$e(tH_I)(ID),rP)=e(H_I(ID),tP)^r=e(H_I(ID),T)^r$$

and end users hash to decrypt the cipher text.

In another exemplary implementation, the identity-based encryption scheme may include a Boneh-Boyen-Goh encryption scheme. The Boneh-Boyen-Goh encryption scheme may support hierarchical identity-based encryption. In this implementation, the trusted third party 108 may choose a random a as its private information. The trusted third party 108 publishes (G, $G_1$=aG, $G_2$, $G_3$, H) as public parameters. In order to encrypt, a producer may choose a random s and set the cipher text to:

$$e(G_1,G_2)^s M, sG, s(id\ H+G_3)$$

For decryption, a producer may contact the trusted third party 108 and obtain $$aG_2+r(id\ H+G_3), rG$$

where r is a random number chosen from a trusted third party 108. The producer then computes the decryption key as:

$$(e(G_1,G_2)^S M)e(rG,s(id\ H+G_3))/e(sG,aG_2+r(id\ H+G_3))=M$$

Once a producer has used an encryption system 100 and the encryption module 102 to encrypt the item information, the encrypted item information 112 may be communicated for storage on an RFID tag 110. The encrypted item information 112 may be stored on the RFID tag 110, which may be attached to or associated with any item.

The batch data 104 may be a database of batch numbers and other production information regarding a particular item that is maintained by a particular producer. The batch data may be considered sensitive information to the producer as it identifies a particular batch of a product that is used along the supply chain. Other producers in the supply chain also may consider batch data from a previous producer sensitive information as they would not want their competitors to be able to identify their suppliers.

In one exemplary implementation, the trusted third party 108 may be the producer himself. For example, each producer may be their own trusted third party 108, who would be able to generate a decryption key when the batch number information is provided. In another exemplary implementation, the trusted third party 108 may be a separate third party entity. There may be more than one trusted third party 108 along a particular supply chain.

In one exemplary implementation, the RFID tag 110 may include multiple different pieces of encrypted item information. Each of the multiple different pieces of encrypted item information 112 may be independently accessible and decryptable. Thus, if a particular RFID tag 110 includes encrypted information from multiple different producers and a recall is issued by only a single producer, then only the recalled batch information would be decrypted. The other encrypted information would maintain its encryption and, thus, its secrecy. If a producer issues a recall and a particular RFID tag 110 does not include any of the batch recall information, then all of the multiple different pieces of encrypted item information 112 on that RFID tag 110 remain encrypted and thus remain secret.

The re-encryption module 106 may be configured to re-encrypt the encrypted item information 112 using the identity-based encryption scheme to re-randomize the encrypted item information. In this manner, the identity-based encryption scheme may be universally re-encryptable. The re-encryption module 106 may re-encrypt the encrypted item information 112 without knowledge of the batch number used to originally encrypt the item information.

In one exemplary implementation, the Boneh-Franklin (BF) encryption scheme may be universally re-encryptable. The cipher text of the BF encryption R=rP, $e(H(ID), T)^r$ may be re-randomized by computing r'R, $(e(H(ID), T)^r)^{r'}$. In this implementation, the message m (which is not necessarily sensitive) may be transmitted in plaintext alongside the partial cipher text. As an additional benefit, the recall information (e.g., messages m) may be aggregated upstream along the supply chain.

For example:
1. A producer X has a batch "a" which he intends to ship to Y and Y'. He sends the shipment along with [R=rP, $e(H(X|a), T)^r$, $\inf_X$] to Y (and Y'), where $\inf_X$ can be any information he wants to reveal in case of a recall. In case there is no such information, it can be a random number.
2. Consumer Y is an intermediary. He produces several batches "b" from "a" and ships them to consumer Z. Using the re-encryption module 106, he re-randomizes the information of X and sends along [R=r'P, $e(H(X|a), T)^{r'}$, $\inf_X$] [R=rP, $e(H(Y|b), T)^r$, $\inf_Y$].
3. Consumer Z produces the final good "c". Using the re-encryption module 106, he re-randomizes the received information and places an RFID tag 110 on each item with the following information:
   [R=r"P, $(\inf_X|\inf_Y|\inf_Z|H(\inf_X|\inf_Y|\inf_Z)) \oplus H(e(H(X|a), T)^{r''})$][R=r'P, $(\inf_Y|\inf_Z|H(\inf_Y|\inf_Z)) \oplus H(e(H(Y|b), T)^{r'})$][R=rP, $(\inf_Z|H(\inf_Z)) \oplus H(e(H(Z|c), T)^r)$].

In case of a recall, for example, by supplier/consumer Y, he issues the batch "b" to be recalled along with a proof of identity to the trusted third party 108. The trusted third party 108 publishes the private key for Y|b to all resellers (or even end-users) which can then scan their entire inventory for recalled goods. No involvement of intermediary supply chain partners, such as Z is necessary in the tracing. Y himself can issue the recall to the resellers/end-users directly increasing the reaction time to market.

In another exemplary implementation, the Boneh-Boyen-Goh (BBG) encryption scheme may be universally re-encryptable. The solution for BBG encryption enables hiding the plaintext, such that it may contain sensitive information that should only be revealed in case of a recall, but then cipher texts may not be aggregated upstream the supply chain.

Let $e(G_1, G_2)^s M$, sG, s(id H+$G_3$)=($a_1, B_1, C_1$) be the cipher text. Then, the following additional part of the cipher text may be stored on the RFID tag 110:

$$e(G_1,G_2)^r, rG, r((id\ H) \cdot G_3)=(a_2, B_2, C_2)$$

In order to re-randomize using the re-encryption module 106, one chooses two random numbers v, w and computes:

$$a_1 a_2^v, B_1 + vB_2, C_1 + vC_2 \, a_2^w, wB_2, wC_2$$

The result is a cipher text that is a completely indistinguishable cipher text, where the first part is randomized by s+rv and the second part by rw. Each company X places a cipher text for its batch with public key "batch number" |X on the RFID tag 110 or transmits it along the supply chain until it can be stored on the final RFID tag. Such transmission can also occur via RFID tags.

Figure 2:
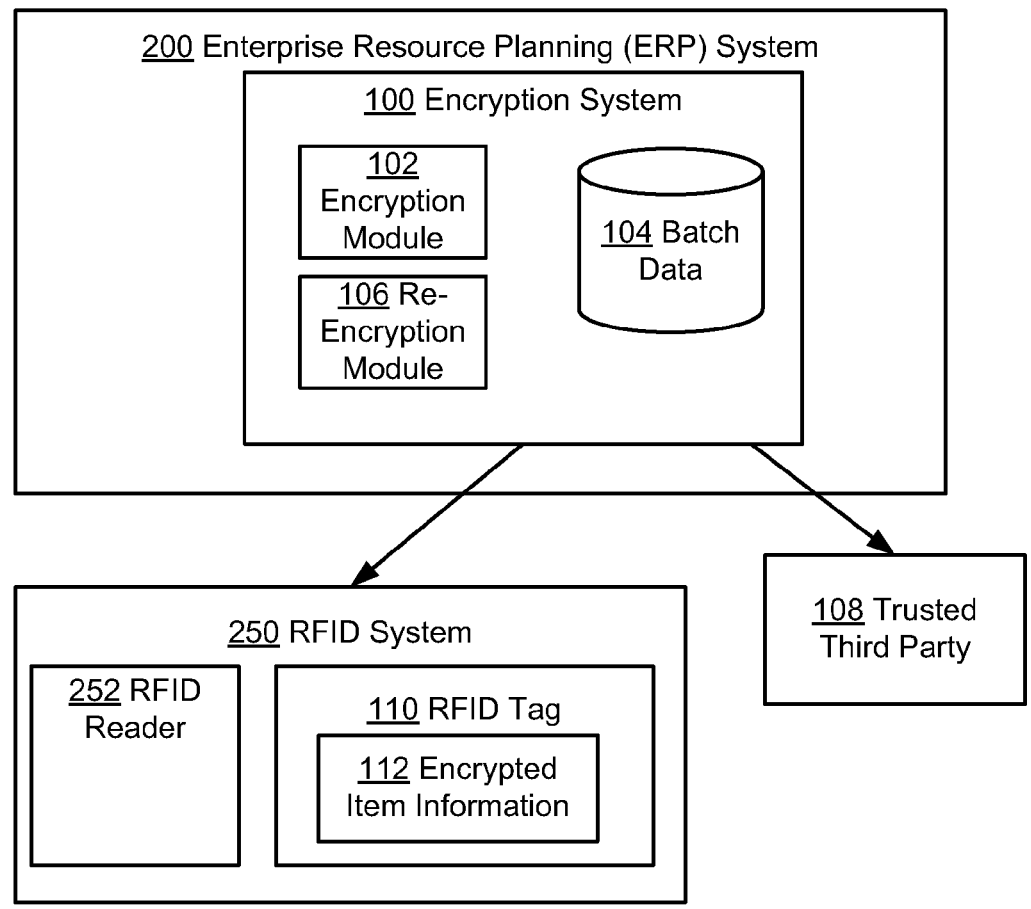
FIG. 2 is an exemplary block diagram of the encryption system of FIG. 1 as included in an enterprise resource system.

Referring to FIG. 2, the encryption system 100 is illustrated as part of an enterprise resource planning (ERP) system 200. The encryption system 100 may include the encryption module 102, the batch data 104, and the re-encryption module 106. The encryption system 100 may be a component or a module of the ERP system 200. The encryption system 100 and the ERP system 200 may interface with each other such that the ERP system 200 provides the batch information to be stored in the batch data 104. Thus, the batch data 104 may store information about the produced batches and private cryptographic information used for encrypting information for each batch. The trusted third party 108 may be a part of the system.

An RFID system 250 may interface with the ERP system 200. The RFID system 250 may include the RFID tag 110 and an RFID reader 252. The encryption system 100, specifically the encryption module 102, may communicate encrypted item information to the RFID system 250. The RFID reader 252 may be configured to communicate the encrypted item information for storage on the RFID tag 110. The re-encryption module 106 may be configured to communicate re-encrypted item information to the RFID system 250. The RFID reader 252 may be configured to communicate the re-encrypted item information for storage on the RFID tag 110.

Figure 3:
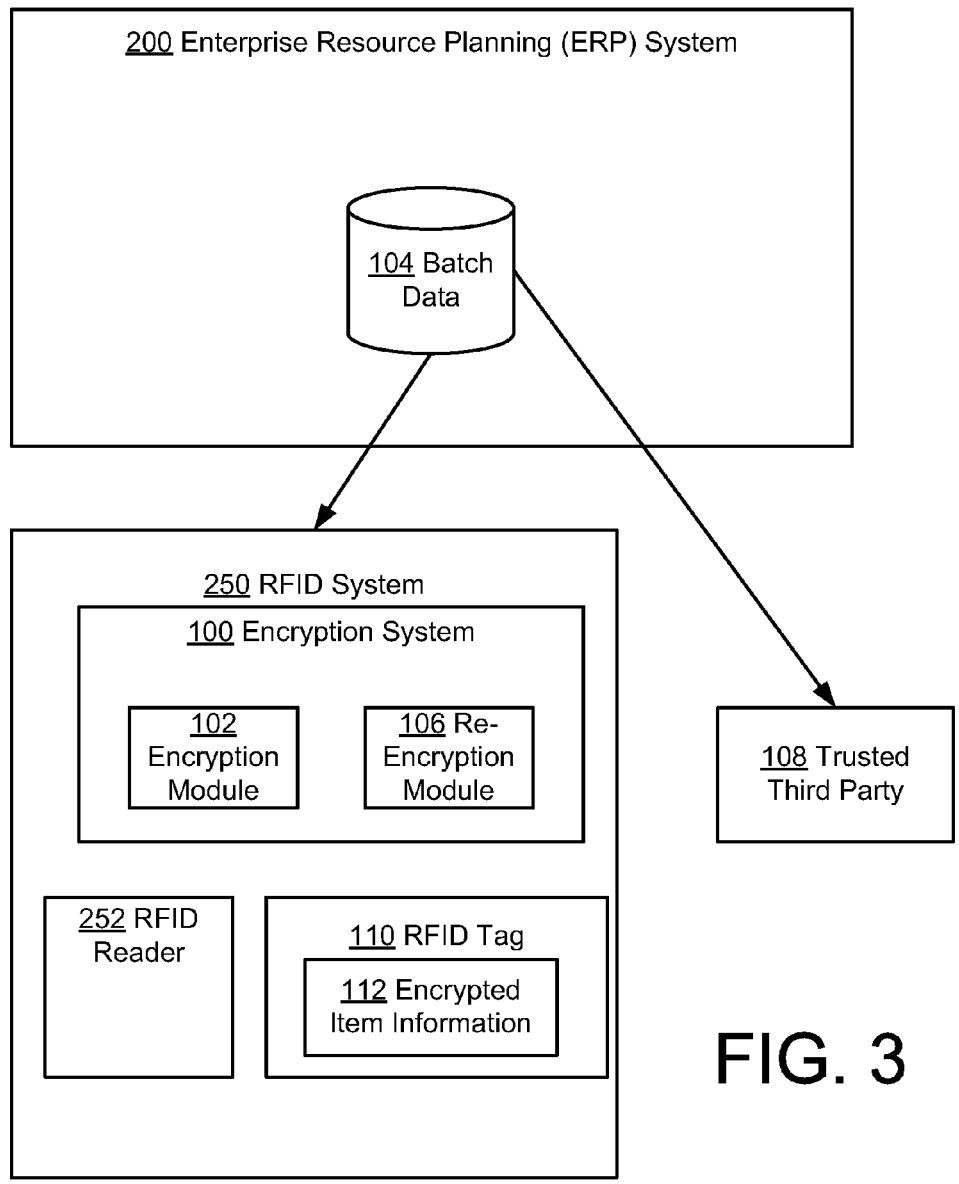
FIG. 3 is an exemplary block diagram of the encryption system of FIG. 1 as included in an RFID system.

In another exemplary implementation, the encryption system 100 may be a part of another system or component. Referring to FIG. 3, the encryption system 100 may be a component or module of the RFID system 250. In this manner, the RFID system 250 encrypts the item information using the batch number provided by the ERP system 200. Thus, an existing interface between the ERP system 200 and RFID system 250 may be utilized to communicate the batch number information from the batch data 104 to the RFID system 250. The batch number may be used by the encryption system 100 to generate the encrypted item information and/or the re-encrypted item information.

In other exemplary implementations, the encryption system 100 may be a component or module of other intermediary systems. For example, the encryption system 100 may be a component of an auto identification system that interfaces with both the ERP system 200 and the RFID system 250. The auto identification system may generate the encrypted item information and/or the re-encrypted item information using the encryption module 102 and/or the re-encryption module 104, respectively.

Figure 4:
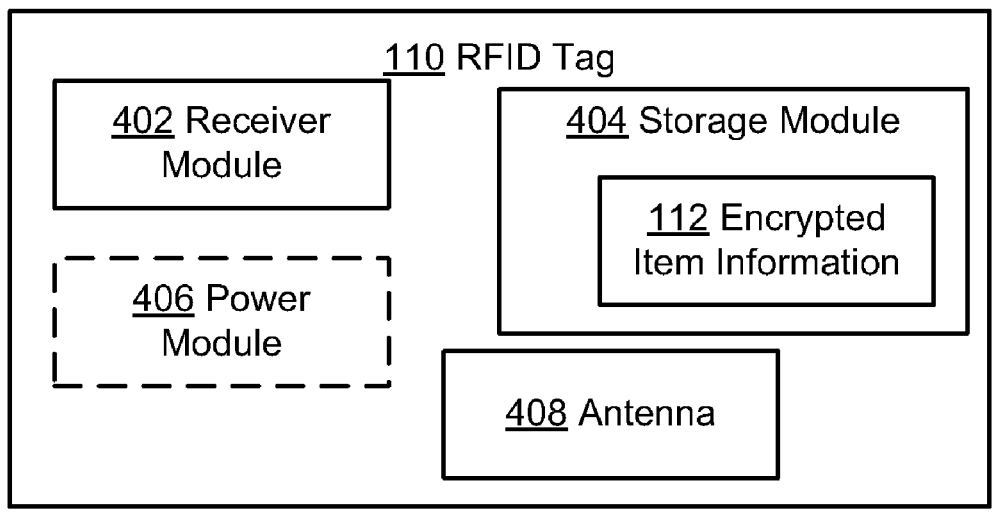
FIG. 4 is an exemplary block diagram of an RFID tag.

Referring to FIG. 4, an exemplary RFID tag 110 is illustrated. The RFID tag 110 may include a receiver module 402, a storage module 404, an optional power module 406, and an antenna 408. The receiver module 402, storage module 404, and power module 406 may be implemented as an integrated circuit (IC).

The RFID tag 110 may be a passive RFID tag, an active RFID tag, or a semi-passive RFID tag. If the RFID tag is a passive RFID tag, then the power module 406 may not be included as part of the RFID tag. In a passive RFID tag, an RFID reader may provide power to the RFID tag such that the information on the RFID tag may be read using the antenna 408. If the RFID tag is an active RFID tag, then the power module 406 may be included. The antenna 408 may be used to transmit and receive information from an RFID reader, such as RFID reader 252 of FIGS. 2 and 3.

The receiver module 402 may be configured to receive multiple different pieces of encrypted item information, such as encrypted item information 112. The storage module 404 may be configured to store the multiple different pieces of encrypted item information 112. Each of the different pieces of the different encrypted item information may be independently accessible and decryptable. In this manner, when an RFID reader scans the RFID tag 110, only the encrypted item information that properly matches up with a decryption key will be revealed. All other pieces of encrypted item information will not be revealed and will remain encrypted. As discussed above, the encrypted item information 112 may be re-encrypted using one of the identity-based encryption schemes to re-randomize the pieces of encrypted item information.

Figure 5:
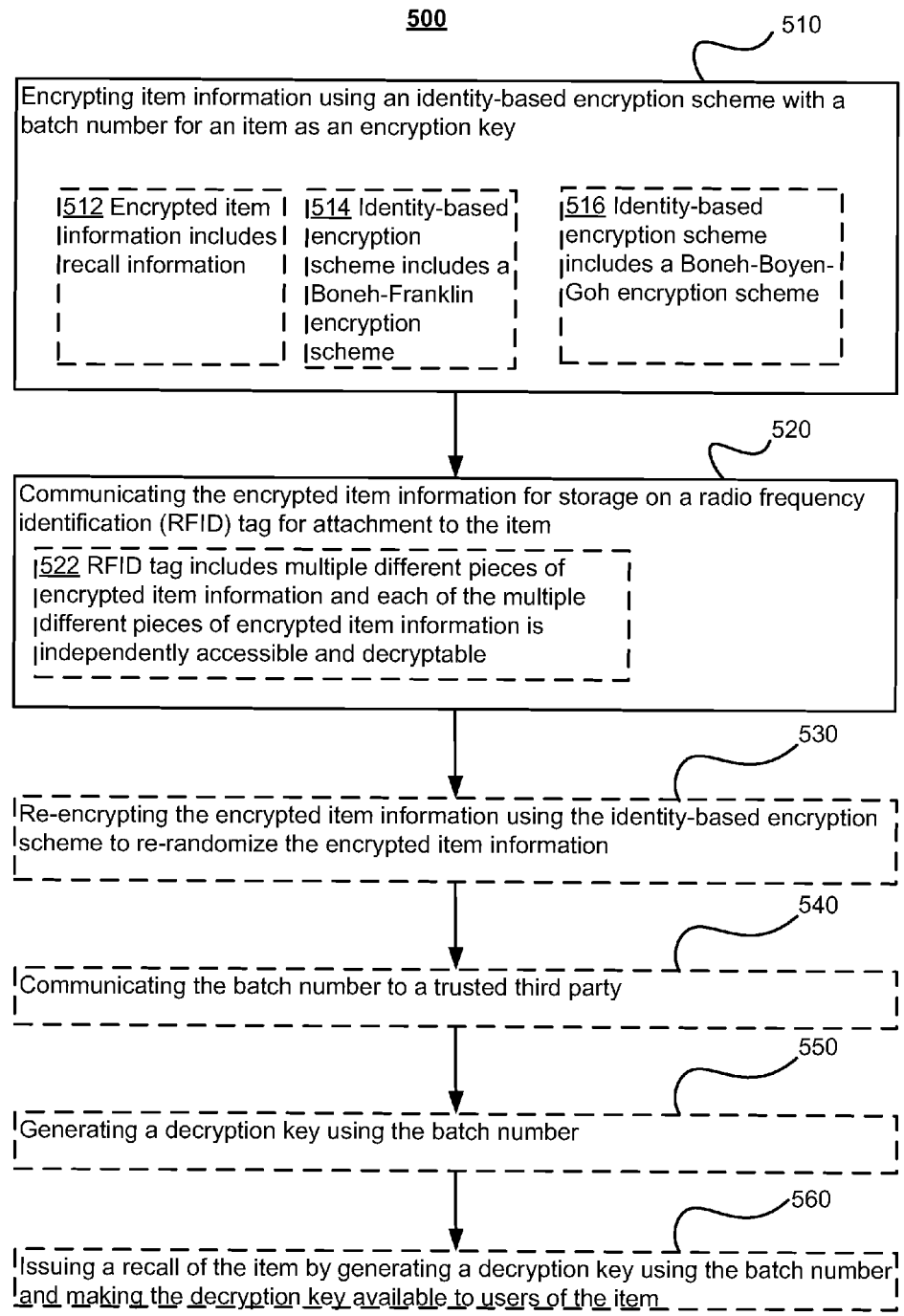
FIG. 5 is an exemplary flowchart of a process that implements the encryption system of FIG. 1.

Referring to FIG. 5, a process 500 is illustrated. The process 500 may include a process for tracing an item. Process 500 may include encrypting item information using an identity-based encryption scheme with a batch number for an item as an encryption key (510) and communicating the encrypted item information for storage on an RFID tag for attachment to the item (520).

For example, the encryption module 102 may be used to encrypt item information using an identity-based encryption scheme with a batch number for an item as an encryption key, where the batch number may be stored in the batch data 104 (510). In one exemplary implementation, the encrypted item information may include recall information (512). The recall information may include instructions to producers, distributor, end consumers, or anyone in the supply chain as to how to handle a recalled item. Instructions may include contact information such as phone number or an address regarding the recalled item or instructions on how to process the recalled item.

In one exemplary implementation, the identity-based encryption scheme may include a Boneh-Franklin scheme (514). In another exemplary implementation, the identity-based encryption scheme may include a Boneh-Boyen-Goh encryption scheme (516).

Encryption module 102 may be configured to communicate the encrypted item information for storage on an RFID tag 110 for attachment to the item (520). The RFID tag 110 may include multiple different pieces of encrypted item information, where each of the multiple different pieces of encrypted item information is independently accessible and decryptable (522).

Process 500 also may include re-encrypting the encrypted item information using the identity-based encryption scheme to re-randomize the encrypted item information (530). For example, the re-encryption module 106 may be used to re-encrypt the encrypted item information (530). In this manner, as the item information is transmitted along the supply chain, the encrypted item information is re-encrypted so that it is re-randomized. The re-encryption module 106 may re-encrypt the item information without knowledge of the encryption key (e.g., the batch number) used to encrypt the item information.

In one exemplary implementation, the batch number may be communicated to a trusted third party 108 (540). A decryption key may be generated using the batch number (550). For example, the trusted third party 108 may generate the decryption key upon proof from a particular producer that they are entitled to receive the private key using the batch number.

Process 500 also may include issuing a recall of an item by generating a decryption key using the batch number and making the decryption key available to users of the item (560). In this manner, the decryption key is generated and is made publicly available for producers and end users along the supply chain to scan items and products using an RFID reader and a decryption key to determine whether or not an item has been recalled. Only encrypted item information on the RFID tag that matches the decryption key will be disclosed to the producer or the end user using the RFID reader.

Figure 6:
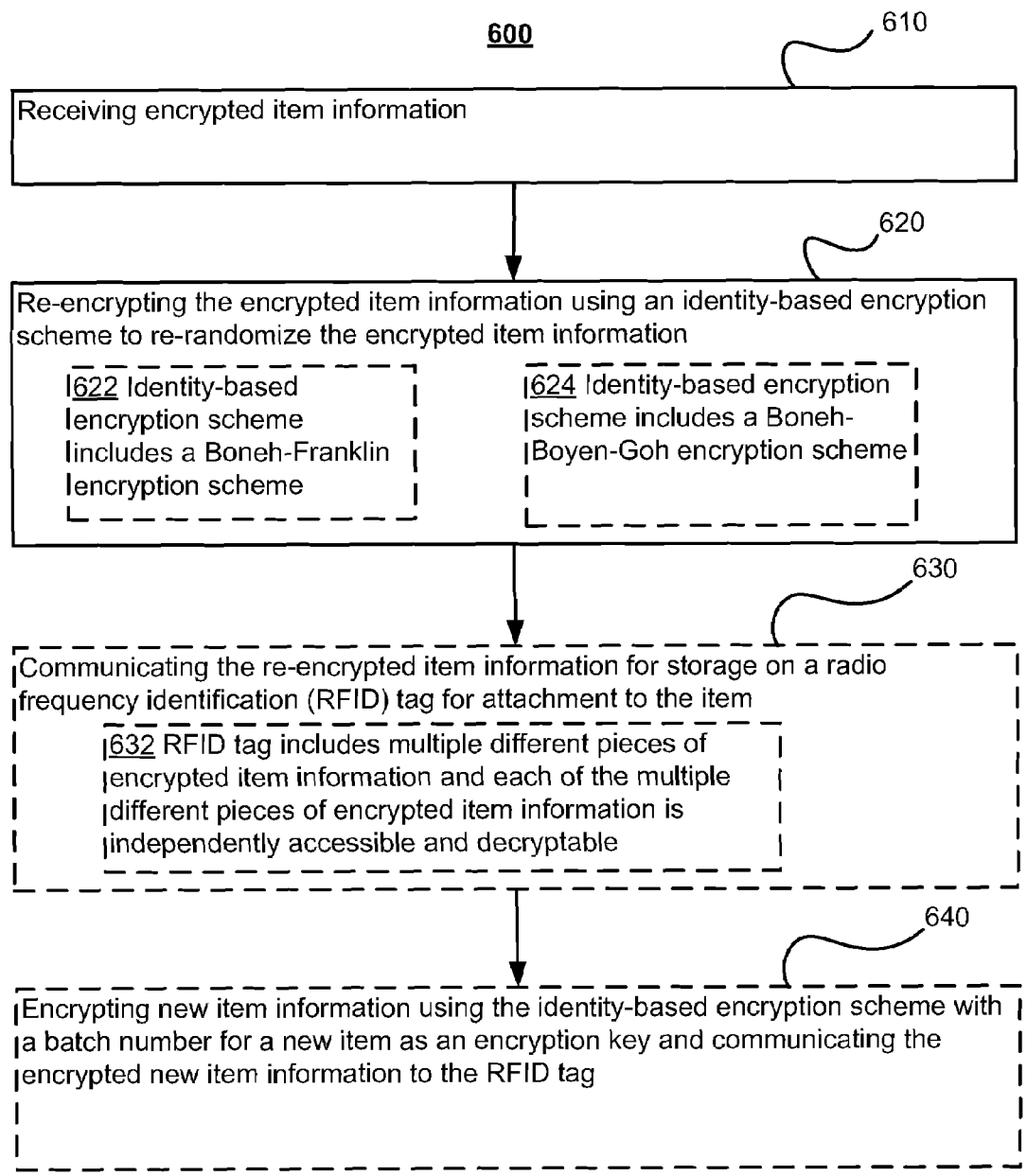
FIG. 6 is an exemplary flowchart of a process that implements the encryption system of FIG. 1.

Referring to FIG. 6, a process 600 for re-encrypting item information is illustrated. Process 600 may include receiving encrypted item information (610), re-encrypting the encrypted item information using an identity-based encryption scheme to re-randomize the encrypted item information (620) and communicating the re-encrypted item information for storage on an RFID tag for attachment to the item (630).

For example, the re-encryption module 106 may be configured to receive the encrypted item information. The re-encryption module 106 may be configured to re-encrypt the encrypted item information using one of the identity-based encryption schemes (620). In one exemplary implementation, the identity-based encryption scheme may include a Boneh-Franklin encryption scheme (622). In another exemplary implementation, the identity-based encryption scheme may include a Boneh-Boyen-Goh encryption scheme (624). The encryption system 100 may communicate the re-encrypted item information for storage on the RFID tag 110. The RFID tag 100 may include multiple different pieces of encrypted item information and each of the multiple different pieces of encrypted item information may be independently accessible and decryptable (632). The re-encryption module 106 may be configured to re-encrypt to encrypted item information without knowledge of the encryption key (e.g., batch number) used to encrypt the item information.

Process 600 also may include encrypting new item information using the identity-based encryption scheme with a batch number for a new item as an encryption key in communicating the encrypted new item information to the RFID tag (640). For example, the encryption module 102 may encrypt new item information using the identity-based encryption scheme with a batch number from the batch data 104 for the new item as the encryption key. The encryption module 102 may communicate the encrypted new item information to the RFID tag 110. In this manner, producers along the supply chain may provide their own encrypted item information as well as re-encrypting item information received from previous producers in the supply chain. That way the information from previous producers is re-randomized such that supply chain secrecy is maintained throughout the supply chain.

Figure 7:
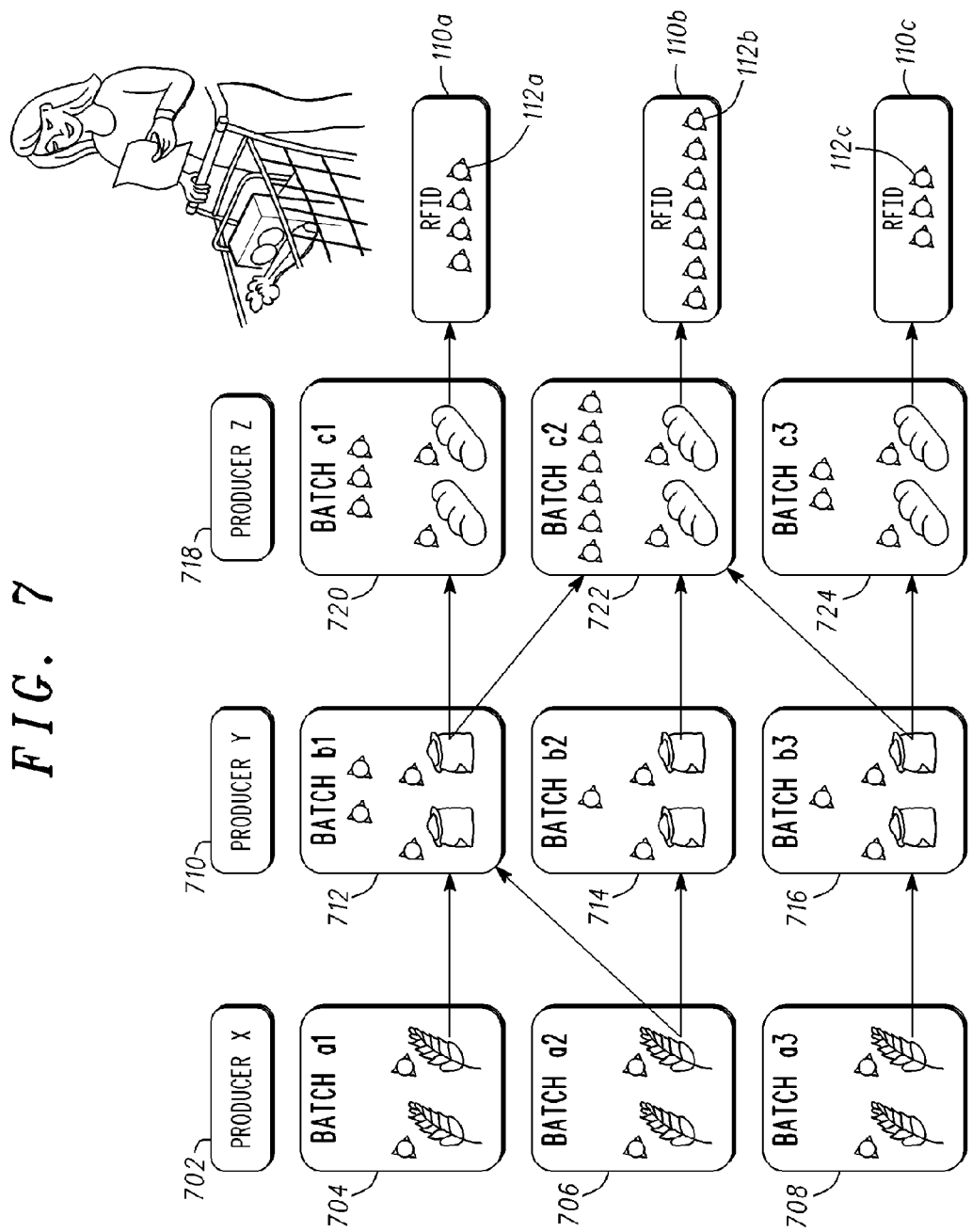
FIG. 7 is an exemplary block diagram of an example illustration of the encryption system of FIG. 1.

Referring to FIG. 7, an illustration is provided as to how products may be traced in the supply chain. For example, Producer X 702 may sell grain. The grain may be shipped in different batches such as batch a1 704, batch a2 706, and batch a3 708. Producer Y 710 may buy grain from Producer X 702 and make flour out of it. Producer Y 710 also makes different batches of flour such as batch b1 712, batch b2 714, and batch b3 716. Note that the different batches from Producer X 702 may contribute to a single batch of flour produced by Producer Y 710. For example, batch a3 708 is used to produce batch b3 716. However, batch a2 706 is used by Producer Y 710 to produce both batch b1 712 and batch b2 714. Also, batch a1 704 is used to produce batch b1 712.

Producer Z 718 uses the flour from Producer Y 710 to bake bread. Just as Producer X 702 and Producer Y 710 made different batches, so too does Producer Z 718 make multiple batches. For example, Producer Z 718 may produce multiple batches of bread including batch c1 720, batch c2 722, and batch c3 724.

In one exemplary implementation, each of the producers (Producer X 702, Producer Y 710, and Producer Z 718) may trace each of the separate batches using encrypted item information that is stored on an RFID tag. For example, each of the producers may use an ERP system such as the ERP system 200 of FIG. 2. The batch data 104 may store information about the produced batches and private cryptographic information used for encrypting information for each batch. To enable product tracing, each of the producers may attach RFID tags 110a, 110b and 110c to their goods. The RFID tags 110a, 110b and 110c may contain item information 112a, 112b, and 112c. The item information 112a, 112b, and 112c may be encrypted using an identity-based encryption scheme. In each part of the supply chain, the producer will include encrypted item information about the batch that producer produced, and about the products and batches used in his product.

Figure 8:
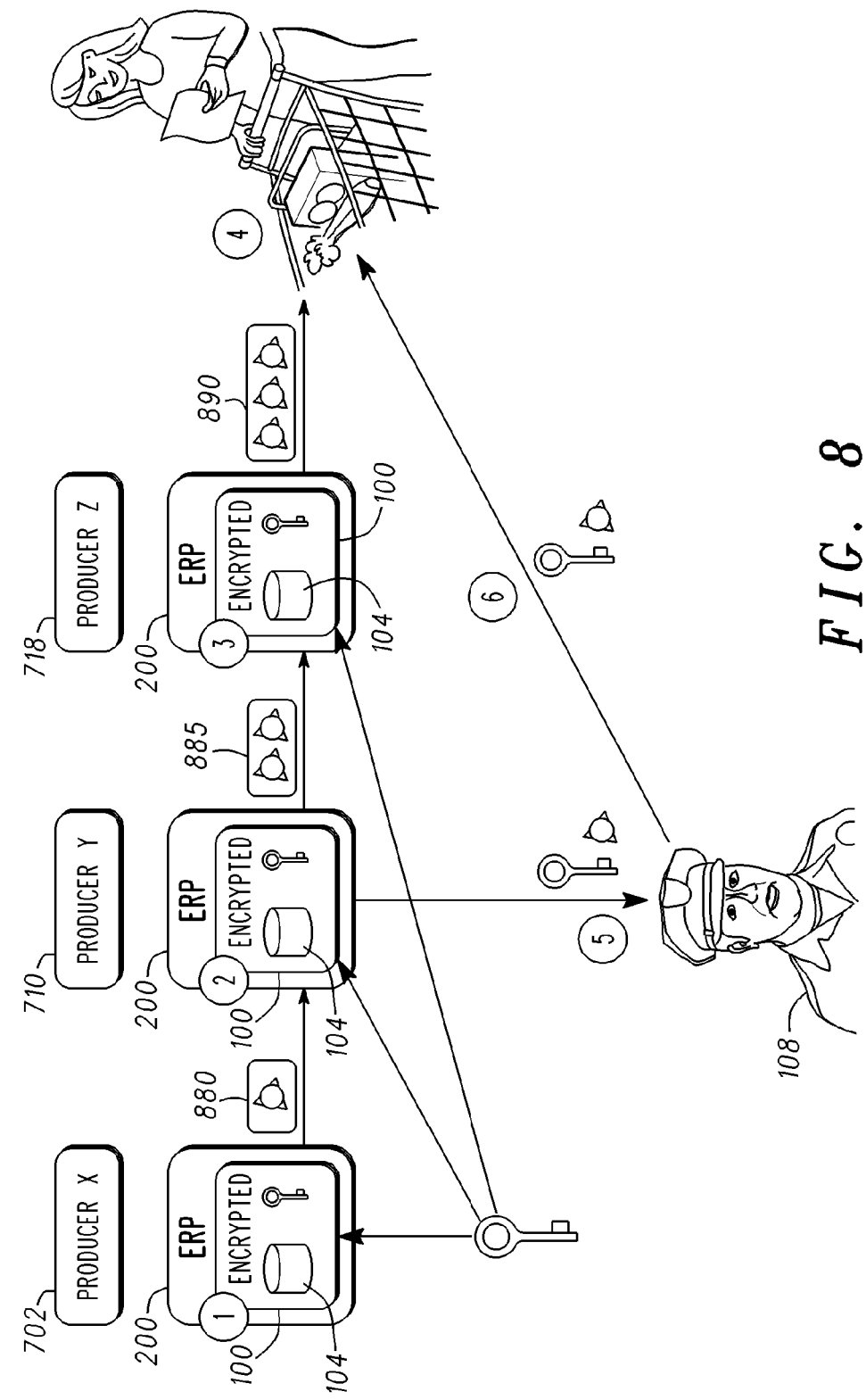
FIG. 8 is an exemplary block diagram of an example illustration of the encryption system of FIG. 1.

Referring also to FIG. 8, Producer X 702 produces a good such as wheat. In step 1, information about the batch of the goods is encrypted using an identity-based encryption scheme. The encrypted item information is written to an RFID tag 880 and sent to Producer Y 710. Producer X 702 may store the information about the batch and the private cryptographic information in the batch data 104 of the encryption system 100 of his ERP system 200.

In step 2, Producer Y 710 may produce a good using different batches from Producer X 702. Each batch produced by Producer Y 710 may contain encrypted item information about the batch of the good. Producer Y 710 may use the encryption system 100 to encrypt the item information about the good produced by Producer Y 710 and to write the information to an RFID tag 885 that is sent along with the goods to Producer Z 718. The RFID tag 885 may include the encrypted item information about the batches from Producer Y 710 and also include the re-encrypted item information which has been re-randomized about the batches and encrypted item information that was received from Producer X 702. Producer Y 710 may store this information in the batch data 104 of his encryption system 100.

Although FIG. 8 illustrates a simple example in which each batch only contains products from one other batch, FIG. 7 illustrates more complex examples in which materials from different batches may contribute to a single batch. In this instance, each of the different pieces of encrypted item information that is used to produce a single batch is re-encrypted using the re-encryption module 106.

In step 3, Producer Z 718 may produce a good and fit it with an RFID tag 890 containing encrypted information similar to step 2. In step 4, the finished product may be shipped to a retailer that will offer the product to customers. The finished product may contain the single RFID tag 890 which includes the encrypted item information regarding each of the batches from each of the different producers that was used to produce the finished product.

In the food industry, samples of goods from every batch may be analyzed in a laboratory in each part of the supply chain to ensure that goods do not contain bacteria or other harmful contaminants. It is a common practice to ship the goods before having the laboratory results, since results usually arrive before the goods are used for the production status or are consumed. If there is a problem, the products may be recalled. Sometimes laboratory results arrive after goods have been used in further production steps. In this example, in step 5, Producer Y 710 produced one batch of rotten goods. The goods were already processed by Producer Z 718 and shipped to a retailer. To enable recalling of the affected products, Producer Y 710 may reveal the private cryptographic information about the rotten batch to a trusted third party 108. In step 6, the trusted third party 108 may publish this information to all retailers. The retailers can use this information to find the affected products and remove them from their shelves.

Although the examples provided illustrate encrypted item information being stored on RFID tags, other techniques might be used such as, for example, barcodes, two dimensional barcodes or holograms. In other exemplary implementations, the encrypted item information may be sent in advance, for example, using messages over a computer network. In another exemplary implementation, the encrypted item information may be sent on demand, for example, using messages over a computer network. In these examples, the encrypted item information might be exchanged using emails, web services, or remote procedure calls (RPC).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for tracing an item, the method comprising:
   encrypting item information using an identity-based encryption scheme with a batch number for an item as a private encryption key; and
   communicating the encrypted item information for storage on a radio frequency identification (RFID) tag for attachment to the item, wherein:
   the RFID tag includes multiple different pieces of encrypted item information from multiple different producers, wherein each of the producers uses their own batch number as a private encryption key to encrypt the item information using the identity-based encryption scheme, and
   each of the multiple different pieces of encrypted item information is independently accessible and decryptable.

2. The method as in claim 1 further comprising re-encrypting the encrypted item information using the identity-based encryption scheme to re-randomize the encrypted item information.

3. The method as in claim 1 wherein the encrypted item information includes item recall information.

4. The method as in claim 1 wherein the identity-based encryption scheme includes a Boneh-Franklin encryption scheme.

5. The method as in claim 1 wherein the identity-based encryption scheme includes a Boneh-Boyen-Goh encryption scheme.

6. The method as in claim 1 further comprising communicating the batch number to a trusted third party.

7. The method as in claim 1 further comprising generating a decryption key using the batch number.

8. The method as in claim 1 further comprising issuing a recall of the item by generating a decryption key using the batch number and making the decryption key available to users of the item.

9. A method for re-encrypting item information, the method comprising:
- receiving encrypted item information;
- re-encrypting the encrypted item information using an identity-based encryption scheme to re-randomize the encrypted item information;
- communicating the re-encrypted item information for storage on a radio frequency identification (RFID) tag;
- encrypting new item information using the identity-based encryption scheme with a batch number for a new item as a private encryption key; and
- communicating the encrypted new item information to the RFID tag.

10. The method as in claim 9 the identity-based encryption scheme includes a Boneh-Franklin encryption scheme.

11. The method as in claim 9 wherein the identity-based encryption scheme includes a Boneh-Boyen-Goh encryption scheme.

12. The method as in claim 9 wherein:
- the RFID tag includes multiple different pieces of encrypted item information; and
- each of the multiple different pieces of encrypted item information is independently accessible and decryptable.

13. A radio frequency identification (RFID) tag, comprising:
- a receiver module that is arranged and configured to receive multiple different pieces of encrypted item information from multiple different producers, wherein each of the producers uses their own batch number as a private encryption key to encrypt the item information; and
- a storage module that is arranged and configured to store the multiple different pieces of encrypted item information, wherein each of the multiple different pieces of encrypted item information is independently accessible and decryptable.

14. The RFID tag of claim 13 wherein each of the multiple different pieces of encrypted item information is re-encrypted using an identity-based encryption scheme to re-randomize the pieces of encrypted item information.

15. The RFID tag of claim 13 wherein the RFID tag is a passive RFID tag.

16. The RFID tag of claim 13 wherein the RFID tag is an active RFID tag.

17. A computer program product for encrypting item information, the computer program product being tangibly embodied on a non-transitory computer-readable medium and including executable code that, when executed, is configured to cause at least one data processing apparatus to execute an encryption module, the encryption module configured to:
- encrypt item information using an identity-based encryption scheme with a batch number for an item as a private encryption key; and
- communicate the encrypted item information for storage on a radio frequency identification (RFID) tag for attachment to the item, wherein:
- the RFID tag includes multiple different pieces of encrypted item information from multiple different producers, wherein each of the producers uses their own batch number as a private encryption key to encrypt the item information using the identity-based encryption scheme, and
- each of the multiple different pieces of encrypted item information is independently accessible and decryptable.

18. The computer program product of claim 17 wherein the computer program product further includes executable code that, when executed, is configured to cause the at least one data processing apparatus to execute a re-encryption module, the re-encryption module configured to:
- re-encrypt the encrypted item information using the identity-based encryption scheme to re-randomize the encrypted item information.

* * * * *